(12) United States Patent
Chrysler et al.

(10) Patent No.: US 11,714,382 B2
(45) Date of Patent: Aug. 1, 2023

(54) FABRICATION AND REPLICATION OF VOLUME HOLOGRAPHIC OPTICAL ELEMENTS

(71) Applicant: Arizona Board of Regents on Behalf of the University of Arizona, Tucson, AZ (US)

(72) Inventors: Benjamin Chrysler, Tucson, AZ (US); Raymond K. Kostuk, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 149 days.

(21) Appl. No.: 17/053,669

(22) PCT Filed: May 7, 2019

(86) PCT No.: PCT/US2019/031102
§ 371 (c)(1),
(2) Date: Nov. 6, 2020

(87) PCT Pub. No.: WO2019/217409
PCT Pub. Date: Nov. 14, 2019

(65) Prior Publication Data
US 2021/0232092 A1    Jul. 29, 2021

Related U.S. Application Data

(60) Provisional application No. 62/668,165, filed on May 7, 2018.

(51) Int. Cl.
*G03H 1/12*    (2006.01)
*G03H 1/20*    (2006.01)
(Continued)

(52) U.S. Cl.
CPC .......... *G03H 1/202* (2013.01); *G03H 1/0248* (2013.01); *G03H 1/0404* (2013.01); *G03H 2001/0439* (2013.01); *G03H 2223/18* (2013.01)

(58) Field of Classification Search
CPC ................ G03H 1/202; G03H 1/0404; G03H 2001/0439; G03H 2223/18; G03H 2227/04; G03H 1/20
(Continued)

(56) References Cited

U.S. PATENT DOCUMENTS 5,422,746 A * 6/1995 Aharoni ................... G02B 5/32
                                                       359/30
5,547,786 A    8/1996 Brandstetter et al.
(Continued)

FOREIGN PATENT DOCUMENTS

WO    2016020632 A1    2/2016

OTHER PUBLICATIONS

International Search Report and Written Opinion dated Jul. 29, 2019 for Application No. PCT/US2019/031102; 14 pages.
(Continued)

*Primary Examiner* — Audrey Y Chang
(74) *Attorney, Agent, or Firm* — Smith, Gambrell & Russell LLP (57) ABSTRACT

Provided are methods for replication (copying) of volume Holographic Optical Elements (HOE) using a master hologram in optical contact with a prism, wherein the master hologram comprises distinct object and reference beam coupling elements, and wherein in the replication process light is coupled from one face of the prism and transmitted through another face of the prism using the distinct object and reference beam coupling elements. Methods for making the master hologram by sequentially forming the distinct (Continued)

object and reference beam coupling elements therein are provided. Further methods for encoding aperture functions directly to the master hologram are provided. Yet further methods provide for forming a copy HOE in an array configuration using a step-and-repeat method wherein the copy HOE is translated laterally by a specified distance before the next exposure is made.

17 Claims, 6 Drawing Sheets

(51) Int. Cl.
  *G03H 1/02* (2006.01)
  *G03H 1/04* (2006.01)
(58) Field of Classification Search
  USPC .............................. 359/12, 30, 13
  See application file for complete search history.

(56) References Cited

U.S. PATENT DOCUMENTS

| | | | |
|---|---|---|---|
| 5,557,431 A | 9/1996 | Pepper | |
| 5,781,317 A * | 7/1998 | Kawazoe | G02B 27/0103 359/13 |
| 7,710,623 B2 * | 5/2010 | MacMaster | G03H 1/0408 359/12 |
| 8,614,842 B2 * | 12/2013 | Aspnes | G03H 1/202 359/12 |
| 2004/0175627 A1 | 9/2004 | Sutherland et al. | |
| 2007/0223070 A1 * | 9/2007 | Balistreri | G11B 7/28 |
| 2007/0229927 A1 * | 10/2007 | Iriguchi | G03H 1/0005 359/12 |
| 2009/0168129 A1 | 7/2009 | Raguin et al. | |
| 2010/0157400 A1 * | 6/2010 | Dimov | G02B 27/0172 359/13 |
| 2013/0101253 A1 * | 4/2013 | Popovich | G02B 27/017 385/37 |

OTHER PUBLICATIONS

Bruder, et al.; "Mass production of volume holographic optical elements (vHOEs) using Bayfol® HX photopolymer film in a roll-to-roll copy process"; Practical Holography XXXI: Materials and Applications; Proc. of SPIE; vol. 10127, p. 101270A-1-101270A-20; 2017.

Tipton, Douglas F.; "New Hologram Replicator for Volume Holograms and Holographic Optical Elements"; Holographic Materials IV, vol. 3294; pp. 136-145, International Society for Optics and Photonics, 1998.

Stojanoff, Christo G.; "Review of the technology for the manufacturing of large-format DCG holograms for technical applications"; Practical Holography XI and Holographic Materials III, vol. 3011, pp. 267-279, International Society for Optics and Photonics, 1997.

* cited by examiner

FABRICATION AND REPLICATION OF VOLUME HOLOGRAPHIC OPTICAL ELEMENTS

CROSS-REFERENCE TO RELATED APPLICATION

This application is a National Phase filing of International (PCT) Application Number PCT/US2019/031102, filed May 7, 2019, which claims the benefit of United States (US) Provisional Application Number 62/668,165, filed May 7, 2018, each of which are hereby incorporated by reference in their entirety.

FEDERAL FUNDING ACKNOWLEDGEMENT

This invention was made with government support under Grant Nos. EEC-1041895 and DGE-1143953 awarded by NSF. The government has certain rights in the invention.

FIELD OF THE INVENTION

Aspects of the present invention relate generally to methods for replication (copying) of volume Holographic Optical Elements (HOE), and in more particular aspects to methods for replication of volume HOE using a master hologram in optical contact with a prism, wherein the master hologram comprises distinct object and reference beam coupling elements, and wherein in the copy process light is coupled from one face of the prism and transmitted through another face using the distinct object and reference beam coupling elements. Additional aspects relate to methods for making the master hologram by sequentially forming the distinct object and reference beam coupling elements therein. Further aspects relate to methods for encoding aperture functions directly to the master hologram, and to methods for forming a copy HOE in an array configuration.

BACKGROUND

Figure 1:
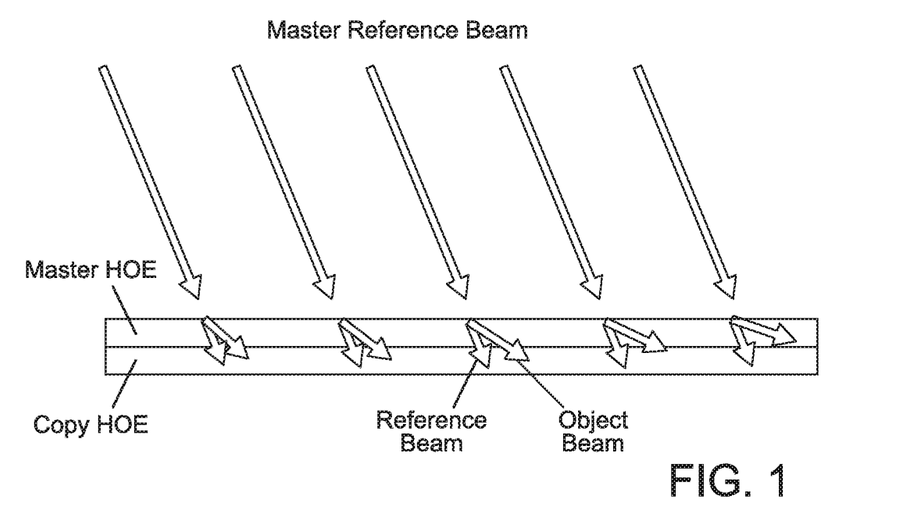
FIG. 1 shows a diagram of a conventional, prior art, contact copy technique for replication (copying) of a Holographic Optical Element (HOE).

Hologram replication is an essential topic for mass-production of volume Holographic Optical Elements (HOE) of all types and for fabrication of large-format arrayed HOE's. Nearly all hologram replication techniques to date have been based on a variant of the "contact copy" technique (Bruder, et al., "Mass production of volume holographic optical elements (vHOEs) using Bayfol® HX photopolymer film in a roll-to-roll copy process," *Practical Holography XXXI: Materials and Applications*, vol, 10127, p. 101270A. International Society for Optics and Photonics, 2017, Tipton, Douglas F., "New hologram replicator for volume holograms and holographic optical elements," *Holographic Materials IV*, vol. 3294, pp. 136-145, International Society for Optics and Photonics, 1998; Aspnes, et al., "Volume hologram replicator for transmission type gratings," U.S. Pat. No. 8,614,842, issued Dec. 24, 2013, and Stojanoff, Christo G., "Review of the technology for the manufacturing of large-format DCG holograms for technical applications," *Practical Holography XI and Holographic Materials III*, vol. 3011, pp. 267-279. International Society for Optics and Photonics, 1997)[1-4]. In "contact copy" techniques, a copy of a "master HOE" is made by placing the master in direct contact with the "copy HOE" as depicted in FIG. 1. The master is designed to diffract light with 50% efficiency to the +$1^{st}$ order and 50% to the $0^{th}$ order. The resulting beams interfere and form a fringe pattern with the same lateral spatial frequency as the master HOE. The resulting interference pattern exposes the underlying holographic material to form the copy HOE.

SUMMARY OF THE INVENTION

Particular aspects provide methods for replicating holographic optical elements (HOE), to comprising: transmitting light through distinct object and reference beam coupling elements of a master holographic optical element (HOE), to provide $0^{th}$ and $1^{st}$ order transmitted light from the object and reference beam coupling elements; coupling the $1^{st}$ order transmitted light from a first face of a prism, in optical contact with the master HOE, through a second face of the prism using the distinct object and reference beam coupling elements; and exposing a copy HOE, positioned at a distance and separate from the second face of the prism, to the $1^{st}$ order light transmitted through the second face of the prism, wherein the distance is such that the $1^{st}$ order object and reference beam light transmitted through the second face of the prism overlaps at an exposure region of the copy HOE to form a holographic exposure, while unwanted $0^{th}$ order light is filtered from the prism by total internal reflection. In the methods, the master HOE preferably comprises an encoded aperture function. In the methods, the master HOE may comprise multiple distinct object and reference beam coupling elements to provide an multiplexed master HOE. In the methods, the $0^{th}$ order light may be filtered from the prism by total internal reflection through a third face of the prism. The methods may further comprise repeated steps of laterally translating and exposing of the copy HOE, to provide a copy HOE having an array of copied HOE.

Additional aspects provide systems for replicating holographic optical elements (HOE), comprising: a master holographic optical element (HOE) having distinct object and reference beam coupling elements; a prism having a first face and a second face, the master HOE and prism configured such that the first face of the prism is in optical contact with the distinct object and reference beam coupling elements of the master HOE to provide, in operation of the device, for coupling $1^{st}$ order light, transmitted from the distinct object and reference beam coupling elements, from the first face of the prism through the second face of the prism, and for filtering of unwanted $0^{th}$ order light from the prism by total internal reflection; and a copy HOE, positioned at a distance and separate from the second face of the prism such that $1^{st}$ order object and reference beam light transmitted through the second face of the prism overlaps at an exposure region of the copy HOE to form a holographic exposure. In the systems, the master HOE preferably comprises an encoded aperture function. In the systems, the master HOE may comprise multiple distinct object and reference beam coupling elements to provide a multiplexed master HOE. The systems may be configured such that the $0^{th}$ order light is filtered from prism by total internal reflection through a third face of the prism. The systems may further comprise a light source suitable for exposing the copy HOE. The systems may further comprise a copy HOE support member, configured to laterally translate the copy HOE between repeated exposure of the copy HOE, to provide a copy HOE having an array of copied HOE.

Additional aspects provide methods for fabricating a master holographic optical element (HOE), comprising: positioning a first face of a prism at a distance from an aperture; forming a reference beam coupling element in a master HOE in optical contact with a second face of the prism by illuminating the master HOE with a conjugate reference beam passed through the aperture, the first face of the prism, and the second face of the prism, and with a separate master reference beam initially incident on a third prism face and internally reflected to be incident on the master HOE through the second prism face; and forming an object beam coupling element, at a location different from that of the reference coupling element, in the master HOE in optical contact with the second face of the prism by illuminating the master HOE with a conjugate object beam passed through the aperture, the first face of the prism, and the second face of the prism, and with the separate master reference beam initially incident on a third prism face and internally reflected to be incident on the master HOE through the second prism face, wherein a master HOE comprising an encoded aperture function is provided, and wherein the reference and object beam coupling elements may be formed in any sequential order. In the methods, in forming the reference beam coupling element, an absorber may be positioned that blocks the master reference beam in regions where it is not internally reflected to be incident upon the reference beam coupling element. In the methods, in forming the object beam coupling element, an absorber may be positioned that blocks the master reference beam in regions where it is not internally reflected to be incident upon the object beam coupling element. In the methods, another absorber may be placed on the master HOE (e.g., in direct or optical contact with the prism-distal face of the master HOE) to reduce spurious reflection grating formation during the hologram formation. In the methods, the master reference beam may a planar beam and may be normally incident on the third face of the prism and reflected to be incident on the master HOE through total internal reflection. The methods may comprise forming, by different exposures at different locations in the master HOE, multiple reference and object beam coupling elements to provide an array of multiple reference and object coupling elements in the master HOE. In the methods, neighboring coupling elements in the array may be formed by using dissimilar beam angles. The methods may comprise multiplexing the coupling elements on the master HOE at several different wavelengths. In the methods, forming the reference and object conjugate beams used in forming the master HOE coupling elements may comprise modifying the light by reflective, refractive, or holographic optical element to match the aperture of the prism.

Further provides are systems for fabricating a master holographic optical element (HOE), comprising: a prism having a first, second and third face, the first face of the prism positioned separate and at a distance from an aperture; a master HOE forming element in optical contact with the second face of the prism, wherein the prism, master HOE and the aperture are configured to provide, in operation of the device, for illuminating/exposing the master HOE element with reference or object conjugate light beams passed through the aperture, the first face of the prism, and the second face of the prism, and with a separate master reference beam initially incident on the third prism face and internally reflected to be incident on the master HOE through the second prism face, to provide for forming reference and object beam coupling elements at different respective locations in the master HOE forming element. The systems may comprise an absorber configured such that it blocks the master reference beam in regions where it is not internally reflected to be incident upon the master HOE forming element. The systems may comprise another absorber configured on the master HOE forming element to reduce spurious reflection grating formation during hologram formation. The systems may comprise a source of at least one of a master reference beam, a reference conjugate beam, and/or an object conjugate beam. In the systems, the source of the master reference beam may be configured to provide a planar beam, which may be normally incident on the third face of the prism. The systems may be configured to provide for forming, by different exposures at different locations in the master HOE, multiple reference and object beam coupling elements to provide an array of multiple reference and object coupling elements in the master HOE. The systems may be configured such that neighboring coupling elements in the array may be formed by using dissimilar beam angles.

Yet further aspects provide methods for replicating reflection holograms, comprising positioning a copy holographic optical element (HOE), separate and at a distance between first sides of two prisms, each prism having a separate master holographic optical element (HOE) in optical contact with a respective second side thereof. In the methods, each master HOE preferably contains only a single coupling element. In the methods, preferably one master HOE couples the object beam, and the other master HOE couples the reference beam.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

DETAILED DESCRIPTION OF THE INVENTION

Provided are systems and methods for replication (copying) of holograms (e.g., volume Holographic Optical Elements (HOE)) based on the use of a master hologram, having distinct object and reference beam coupling elements, in optical contact with a prism.

Figure 2:
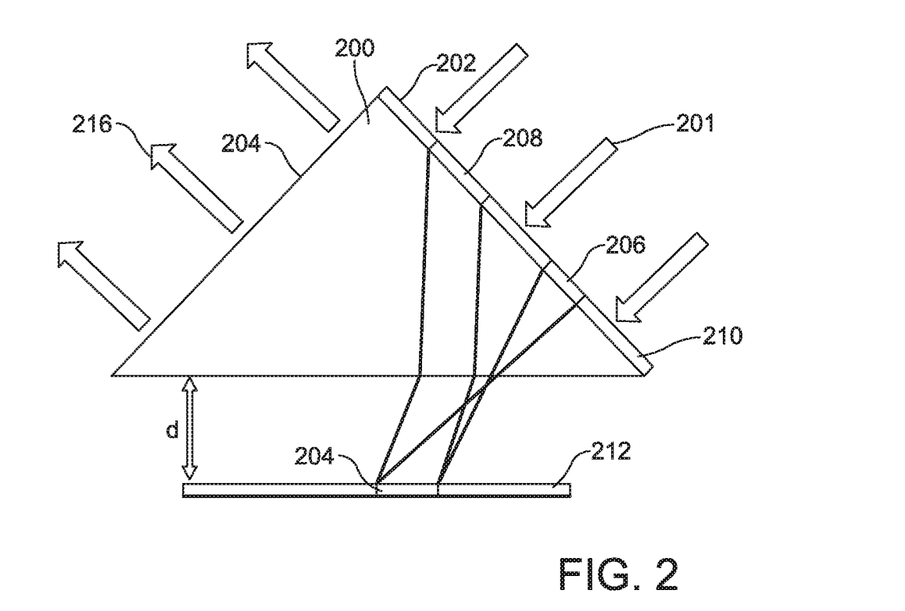
FIG. 2 shows, according to particular exemplary aspects, an embodiment of the presently disclosed system and method for HOE replication.

With reference to FIG. 2, in a copy process, light (e.g., input wavefront 201) is coupled from one face 202 of a prism 200 and transmitted through another face 204 using distinct object and reference beam coupling elements 206, 208 ("object beam coupler 206" and "reference beam coupler 208" respectively) in a master hologram 210 as depicted in FIG. 2. A copy hologram ("copy HOE 212") may be located at a specified distance from the prism 200 so that the transmitted light overlaps at an exposure region 214 to form the holographic exposure, while the unwanted $0^{th}$ order light 216 is filtered from the prism 200 by total internal reflection. The copy HOE 212 may be formed in an array configuration by using a step-and-repeat method, for example, where the copy HOE 212 is translated laterally by a specified distance before the next exposure is made.

Figure 3:
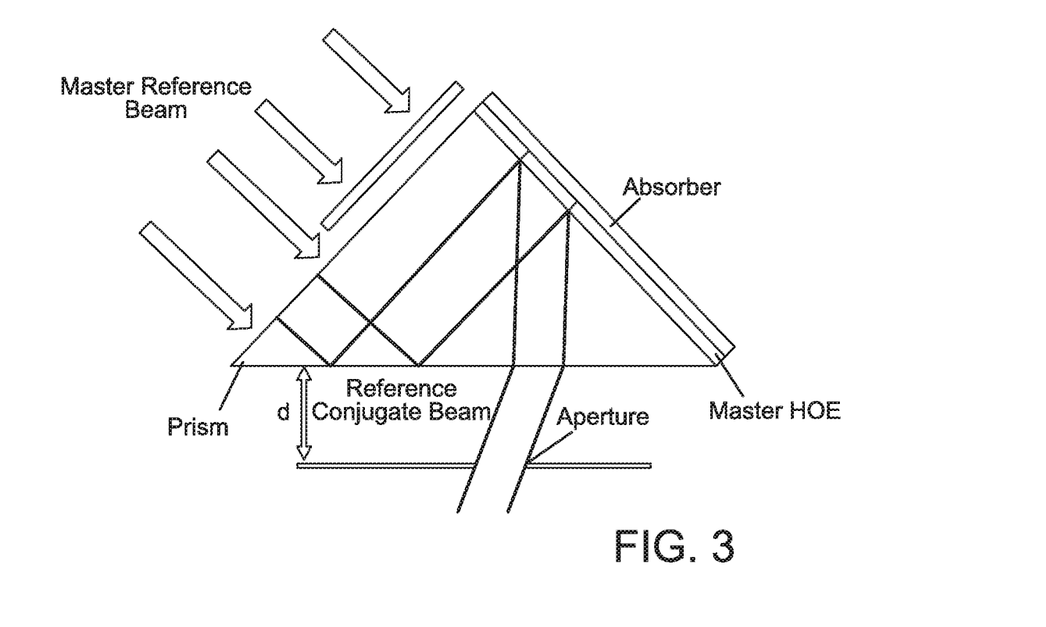
FIG. 3 shows, according to particular exemplary aspects, initial formation of the reference beam coupling element of the master HOE used in the embodiment of FIG. 2.
Figure 4:
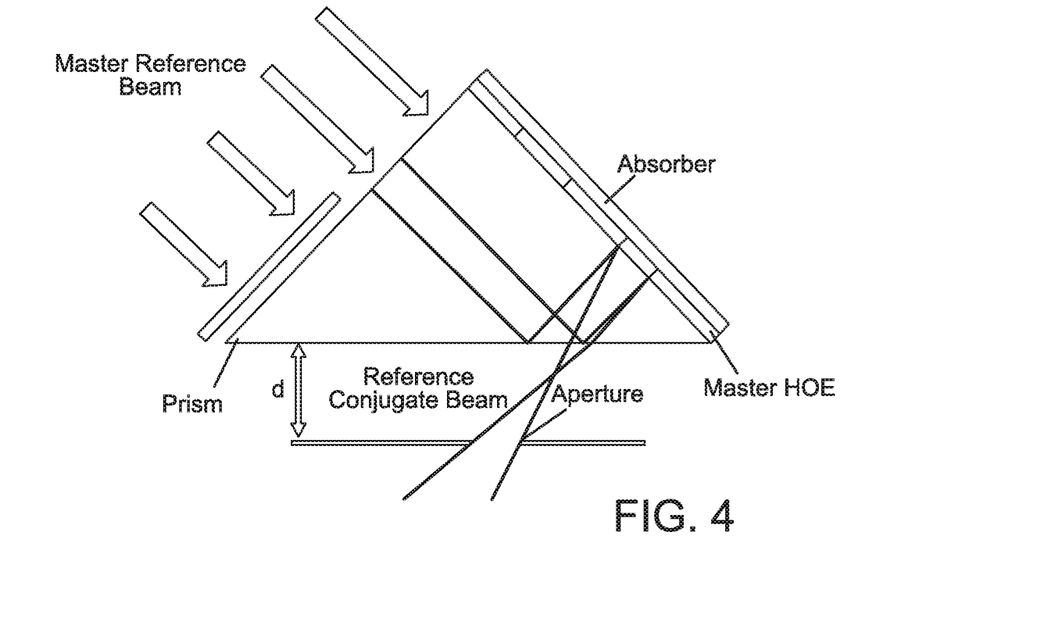
FIG. 4 shows, according to particular exemplary aspects, sequential (relative to formation of the reference beam coupling element of FIG. 3) formation of the object beam coupling element of the master HOE used in the embodiment of FIG. 2.

Additionally provided are systems and methods for fabricating the master hologram(s) used in the replication systems and methods (e.g., like the master HOE 210 of FIG. 2). The master may, for example, be fabricated by sequentially forming the reference beam and object beam coupling elements as depicted in FIGS. 3 and 4. Alternatively, this sequence may be reversed; forming the object beam coupler and then the reference beam coupler in the HOE. Initially, a first face of the prism is placed at a distance from the aperture ("Aperture"). Next, the reference beam coupling element is formed by illuminating the master HOE with: the conjugate reference beam that has passed through the desired aperture, the first prism face, and a second prism face in optical contact with the master HOE; and with a separate "master reference" beam initially incident on a third prism face and internally reflected to be incident on the master HOE through the second prism face. The master reference beam may be, and preferably is, a planar beam and may be, and preferably is, normally incident on one face of the prism and reflected to be incident on the master HOE through total internal reflection. An element that does not transmit light (e.g., an absorber, reflector, etc.), preferably an absorber, is positioned that blocks the master reference beam in regions where it is not reflected to be incident upon the reference coupling element. An non-reflective or substantially non-reflective element, preferably an absorber, is placed on the master HOE (e.g., in direct or optical contact with the prism-distal face of the master HOE) to reduce spurious reflection grating formation during the hologram formation. Finally, the object beam coupling element is formed at a different location on the master HOE following a similar procedure. For example, the object beam coupling element is formed by illuminating the master HOE (at a location different from that of the reference coupling element) with: the conjugate object beam that has passed through the desired aperture, the first prism face, and the second prism face in optical contact with the master HOE; and with the separate "master reference" beam initially incident on the third prism face and internally reflected to be incident on the master HOE through the second prism face. The master reference beam may be, and preferably is, a planar beam and may be, and preferably is, normally incident on one face of the prism and reflected to be incident on the master HOE through total internal reflection. An element that does not transmit light (e.g., an absorber, reflector, etc.), preferably an absorber, is positioned that blocks the master reference beam in regions where it is not incident upon the object coupling element. An non-reflective or substantially non-reflective element, preferably an absorber, is placed on the master HOE (e.g., in direct or optical contact with the prism-distal face of the master HOE) to reduce spurious reflection grating formation during the hologram formation. The order of formation of the reference beam and object beam coupling elements may be reversed. Preferably, the aperture and distance is the same when forming the reference beam and object beam coupling elements. Alternatively, the apertures could be different, provided that the distance during formation of the object beam and reference beam coupling elements was altered to accommodate this.

In the exemplary master hologram 210 depicted in the embodiment of FIG. 2, there are only two coupling elements 206, 208; one for the object beam, and one for the reference beam. Optionally, in the systems and methods disclosed herein, it may be desired to record a master hologram that has more than two coupling elements (e.g., multiple pairs of reference and object beam coupling elements). This may, for example, be useful for arrays where neighboring elements require, or would preferably be formed with dissimilar beam angles. This can be accomplished in a fashion similar to the technique described above by including additional exposures at different locations on the master hologram during fabrication.

Optionally, in the systems and methods disclosed herein, it may also be desired to multiplex the coupling elements in the master hologram. For example, this may be useful for fabrication of full-color holograms for display systems, which may be accomplished by multiplexing the coupling elements on the master at several different wavelengths. The copy process then may involve, for example, illuminating the master simultaneously with each wavelength to the form the full-color copied HOE.

Optionally, in the systems and methods disclosed herein, while the exemplary system/method embodiment depicted in FIG. 2 is configured for copying transmission holograms, the disclosed systems/methods may also be extended to reflection holograms as well (e.g., optionally configured to enable copying of reflection holograms). For example, in a reflection configuration, prisms may be placed on both sides of the copy HOE 212. Each prism may have a separate master hologram. Preferably, one master hologram would couple the object beam, and the other master hologram would couple the reference beam. Each master would be formed in a similar fashion to the transmission geometry master hologram forming method, with the exception that each master would only contain a single coupling element.

The disclosed systems and methods provide a number of substantial advantages over conventional "contact copy" methods.

Enhanced ease-of-use. Unlike contact copy, no contact is required between the master Holographic Optical Element (HOE) and the copy HOE, thus eliminating complexity in the system and enhancing ease-of-use.

Improved Alignment. The optical setup for the disclosed systems and methods is aligned at normal incidence even in cases where an obliquely incident reference beam is desired. This eliminates a potential source of error in the copy process.

Enhanced quality and ease of fabrication of master hologram. In conventional contact copy systems and methods, a master HOE diffraction efficiency of 50% is required. This can be difficult to fabricate and prone to defects because hologram efficiency is most sensitive to temporal and spatial variations in wavefront intensity at this diffraction efficiency (Bruder, et al., supra). By contrast, in the systems and methods disclosed herein, there are no restrictions on master HOE efficiency, so a more stable regime can be utilized. In addition, higher diffraction orders and noise produced by the master, that cause defects in conventional contact copy setups, may be filtered out in the disclosed systems and methods.

Reduced or no sensitivity to mechanical vibration. Holograms formed by conventional contact copy methods often have low efficiency due to sensitivity to small mechanical vibrations causing the fringe pattern to wash out during the exposure (Id). The methods disclosed herein do not require direct or close contact, and thus eliminate this issue.

Increased speed. Most conventional contact copy scan-and-repeat replication systems are slow because "settling time" must be incorporated to reduce mechanical vibration between the master HOE and the copy HOE before an exposure is made (Tipton, Douglas F., supra).

The lack of contact between the master and copy in the presently disclosed systems and methods reduce the settling time required and allow for higher manufacturing speed.

The presently disclosed systems and techniques also provide additional functionalities not possible or difficult to achieve with conventional contact copy systems and methods.

Non-planar reference beams may be used. Most contact copy systems use a planar reference beam (Bruder; et al., supra). Generally, however, use of a non-planar reference beam, as enabled by the presently disclosed systems and methods, is required to achieve desired fringe slant angles along the copy HOE for achieving the highest efficiency for the element.

Aperture functions may be directly encoded into the master hologram. Unlike conventional contact copy systems and methods, in the presently disclosed systems and methods the aperture function may be encoded into the master hologram, thereby eliminating the need for introducing an aperture during the copy exposure, and eliminating an additional alignment step. According to additional aspects, the ability to directly encode aperture functions is particularly useful for making holograms for applications that require complex aperture shapes that would otherwise be difficult to align, and/or that would require a mask in contact with the copy HOE.

Terms (Definitions):

Unless otherwise explained, all technical and scientific terms used herein have the same meaning as commonly understood by one of ordinary skill in the art to which this disclosure belongs.

It is to be understood that the methods and systems are not limited to specific methods, specific components, or to particular compositions. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. "On the order of" can mean approximately, a fraction thereof, or a multiple thereof.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed. All ranges disclosed herein are inclusive and combinable (e.g., ranges of "up to 25%, or, more specifically 5% to 20%" is inclusive of the endpoints and all intermediate values of the ranges of "5% to 25%," etc.).

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not.

As used herein, the term "optical contact" means/describes an interface between two elements in which light is minimally reflected and maximally transmitted without deviation and which is preferably formed by placing two elements in close contact, (e.g., direct or separated only by a thin layer of index-matching material). Optical contact could also be formed if the two elements are placed at a distance that is a fraction of a wavelength from each other, but this is often not possible and preferably not used in/for the disclosed systems and methods. In the disclosed systems and methods, while there is optical contact between the master HOE(s) and the prism(s), and between the absorber (s) and the prism(s), no optical contact, or contact of any kind is required, or desired, between the prism and the Copy HOE. By contrast, in conventional contact copy systems and methods, close contact between the Master and Copy HOEs is required, and optical contact is often preferred.

As used herein, the term "absorber" means any optical element that neither reflects nor transmits light, for example, a neutral density filter.

As used herein, the term "holographic optical element" or "HOE" means any optical element that is formed through a holographic exposure of which consists interfering beams of light. For example, a volume holographic optical element (VHOE), or a diffraction grating defined by holographic lithography.

As used herein, the term "aperture function" refers to the geometrical boundaries to which a light ray bundle is allowed to propagate throughout a system uninhibited and is defined by whichever element is the limiting aperture in the system.

As used herein, the term "encoded aperture function" refers to an aperture function that is defined by an HOE.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods. For example, essential, preferred or optional features of a particular aspect of the invention may be provided in conjunction with the features of other aspects of the invention and vice versa where appropriate.

Although methods and materials similar or equivalent to those described herein can be used in the practice or testing of this disclosure, suitable methods and materials are described below. The term "comprises" means "includes." The abbreviation, "e.g." is derived from the Latin exempli gratis, and is used herein to indicate a non-limiting example. Thus, the abbreviation "e.g." is synonymous with the term "for example."

The present disclosure comprises at least the following aspects:

1. A method for replicating holographic optical elements (HOE), comprising:
transmitting light through distinct object and reference beam coupling elements of a master holographic optical element (HOE), to provide $0^{th}$ and $1^{st}$ order transmitted light from the object and reference beam coupling elements;
coupling the $1^{st}$ order transmitted light from a first face of a prism, in optical contact with the master HOE, through a second face of the prism using the distinct object and reference beam coupling elements; and
exposing a copy HOE, positioned at a distance and separate from the second face of the prism, to the $1^{st}$ order light transmitted through the second face of the prism, wherein the distance is such that the $1^{st}$ order object and reference beam light transmitted through the second face of the prism overlaps at an exposure region of the copy HOE to form a holographic exposure, while unwanted $0^{th}$ order light is filtered from the prism by total internal reflection.

2. The method of aspect 1, wherein the master HOE comprises an encoded aperture function.

3. The method of aspect 1 or 2, wherein the master HOE comprises multiple distinct object and reference beam coupling elements to provide an multiplexed master HOE.

4. The method of any one of aspects 1-3, wherein the $0^{th}$ order light is filtered from the prism by total internal reflection through a third face of the prism.

5. The method of any one of aspects 1-4, further comprising repeated steps of laterally translating and exposing of the copy HOE, to provide a copy HOE having an array of copied HOE.

6. A system for replicating holographic optical elements (HOE), comprising:
a master holographic optical element (HOE) having distinct object and reference beam coupling elements;
a prism having a first face and a second face, the master HOE and prism configured such that the first face of the prism is in optical contact with the distinct object and reference beam coupling elements of the master HOE to provide, in operation of the device, for coupling $1^{st}$ order light, transmitted from the distinct object and reference beam coupling elements, from the first face of the prism through the second face of the prism, and for filtering of unwanted $0^{th}$ order light from the prism by total internal reflection; and
a copy HOE, positioned at a distance and separate from the second face of the prism such that $1^{st}$ order object and reference beam light transmitted through the second face of the prism overlaps at an exposure region of the copy HOE to form a holographic exposure.

7. The system of aspect 6, wherein the master HOE comprises an encoded aperture function.

8. The system of aspect 6 or 7, wherein the master HOE comprises multiple distinct object and reference beam coupling elements to provide an multiplexed master HOE.

9. The system of any one of aspects 6-8, configured such that the $0^{th}$ order light is filtered from prism by total internal reflection through a third face of the prism.

10. The system of any one of aspects 6-9, further comprising a light source suitable for exposing the copy HOE.

11. The system of any one of aspects 6-10, further comprising a copy HOE support member, configured to laterally translate the copy HOE between repeated exposure of the copy HOE, to provide a copy HOE having an array of copied HOE.

12. A method for fabricating a master holographic optical element (HOE), comprising:
positioning a first face of a prism at a distance from an aperture;
forming a reference beam coupling element in a master HOE in optical contact with a second face of the prism by illuminating the master HOE with a conjugate reference beam passed through the aperture, the first face of the prism, and the second face of the prism, and with a separate master reference beam initially incident on a third prism face and internally reflected to be incident on the master HOE through the second prism face; and
forming an object beam coupling element, at a location different from that of the reference coupling element, in the master HOE in optical contact with the second face of the prism by illuminating the master HOE with a conjugate object beam passed through the aperture, the first face of the prism, and the second face of the prism, and with the separate master reference beam initially incident on a third prism face and internally reflected to be incident on the master HOE through the second prism face, wherein a master HOE comprising an encoded aperture function is provided, and wherein the reference and object beam coupling elements may be formed in any sequential order.

13. The method of aspect 12, wherein, in forming the reference beam coupling element, an absorber is positioned that blocks the master reference beam in regions where it is not internally reflected to be incident upon the reference beam coupling element.

14. The method of aspect 12 or 13, wherein, in forming the object beam coupling element, an absorber is positioned that blocks the master reference beam in regions where it is not internally reflected to be incident upon the object beam coupling element.

15. The method of any one of aspects 12-14, wherein another absorber is placed on the master HOE (e.g., in direct/optical contact with the prism-distal face of the master HOE) to reduce spurious reflection grating formation during the hologram formation.

16. The method of any one of aspects 12-15, wherein the master reference beam is a planar beam and normally incident on the third face of the prism and reflected to be incident on the master HOE through total internal reflection.

17. The method of any one of aspects 12-16, comprising forming, by different exposures at different locations in the master HOE, multiple reference and object beam coupling elements to provide an array of multiple reference and object coupling elements in the master HOE.

18. The method of aspect 17, wherein where neighboring coupling elements in the array are formed by using dissimilar beam angles.

19. The method of any one of aspects 12-18, comprising multiplexing the coupling elements on the master HOE at several different wavelengths.

20. The method of any one of aspects 12-19, wherein forming the reference and object conjugate beams used in forming the master HOE coupling elements comprises modifying the light by reflective, refractive, or holographic optical element to match the aperture of the prism.

21. A system for fabricating a master holographic optical element (HOE), comprising:
  a prism having a first, second and third face, the first face of the prism positioned separate and at a distance 'd' from an aperture; and
  a master HOE forming element in optical contact with the second face of the prism, wherein the prism, master HOE and the aperture are configured to provide, in operation of the device, for illuminating/exposing the master HOE element with reference or object conjugate light beams passed through the aperture, the first face of the prism, and the second face of the prism, and with a separate master reference beam initially incident on the third prism face and internally reflected to be incident on the master HOE through the second prism face, to provide for forming reference and object beam coupling elements at different respective locations in the master HOE forming element.

22. The system of aspect 21, further comprising an absorber configured such that it blocks the master reference beam in regions where it is not internally reflected to be incident upon the master HOE forming element.

23. The system of aspect 21 or 22, wherein another absorber is configured on the master HOE forming element to reduce spurious reflection grating formation during hologram formation.

24. The system of any one of aspects 21-23, further comprising a source of at least one of a master reference beam, a reference conjugate beam, and/or a object conjugate beam.

25. The system of aspect 24, comprising a source of a master reference beam configured to be planar beam and normally incident on the third face of the prism.

26. The system of any one of aspects 21-25, configured to provide for forming, by different exposures at different locations in the master HOE, multiple reference and object beam coupling elements to provide an array of multiple reference and object coupling elements in the master HOE.

27. The system of aspect 26, configured such that neighboring coupling elements in the array may be formed by using dissimilar beam angles.

28. A method for replicating reflection holograms, comprising positioning a copy holographic optical element (HOE), separate and at a distance between first sides of two prisms, each prism having a separate master holographic optical element (HOE) in optical contact with a respective second side thereof.

29. The method of aspect 28, wherein each master HOE contains only a single coupling element.

30. The method of aspect 28 or 29, wherein one master HOE couples the object beam, and the other master HOE couples the reference beam.

The present methods and systems may be understood more readily by reference to the following detailed description of preferred embodiments and the Examples included therein and to the figures and their previous and following description.

EXAMPLE 1

The Master Hologram Fabrication and Replication Systems and Methods Described in This Disclosure Were Implemented, and Shown to Provide Substantial Benefits Over Conventional Systems and Methods This working example describes implementations of the above-described systems and methods.

In these implementations, the reference beam was a planar wavefront with angle $\theta_1=2.5°$, and the object beam was a cylindrical wavefront that was formed by a cylindrical lens and has center angle $\theta_2=25°$. The distance was set to d=30 mm and a step and repeat (e.g., lateral step and repeat exposure) method was used to form an array of cylindrical holographic lenses.

Figure 5A:
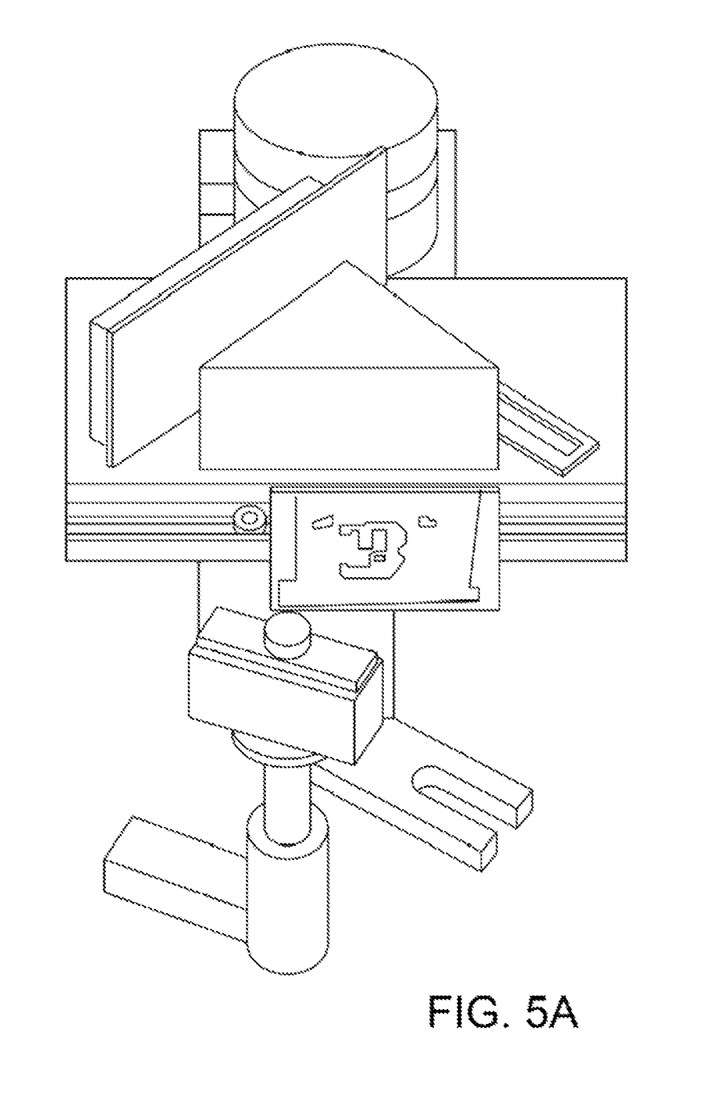
FIGS. 5a-d show, according to particular exemplary aspects, laboratory implementations of the replication techniques described in this disclosure. (a) master hologram fabrication apparatus, (b) hologram copy apparatus, (c) fabricated holographic lens array, (d) spectral diffraction efficiency of each holographic lens in the array of (c).

FIG. 5(a) shows the master fabrication apparatus that was used to implement the master hologram fabrication. As depicted in FIG. 4, FIG. 5(a) shows a prism (shown near center) placed at a distance=30 mm in relation to an 8 mm×20 mm rectangular aperture (shown below the prism). A laser beam is focused by a cylindrical lens (shown in lower left) to form a conjugate object beam which passes through the rectangular aperture and through the lower face of the prism. A master reference beam passes through an absorber with a configurable window (to the upper left of the prism) and is transmitted into the prism. Depicted in FIG. 4 but not shown in FIG. 5(a) is the Master HOE and absorber which would be placed in optical contact with the upper right face of the prism.

Figure 5B:
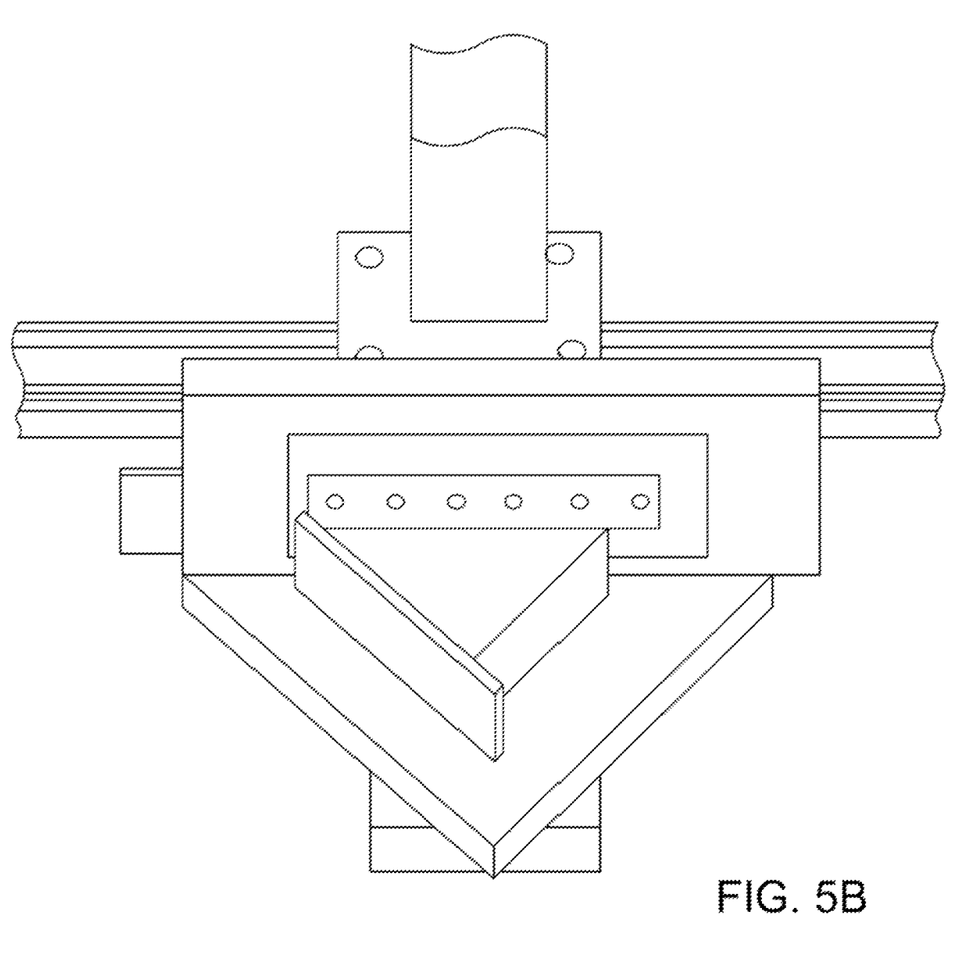

FIG. 5(b) shows the copy apparatus that was used to implement the step-and-repeat copy method. As depicted in FIG. 2, FIG. 5(b) shows a prism (lower center) with its lower left face in optical contact with a Master HOE. At a distance=30 mm above the upper prism face is shown a support structure in which is held the Copy HOE.

Figure 5C:
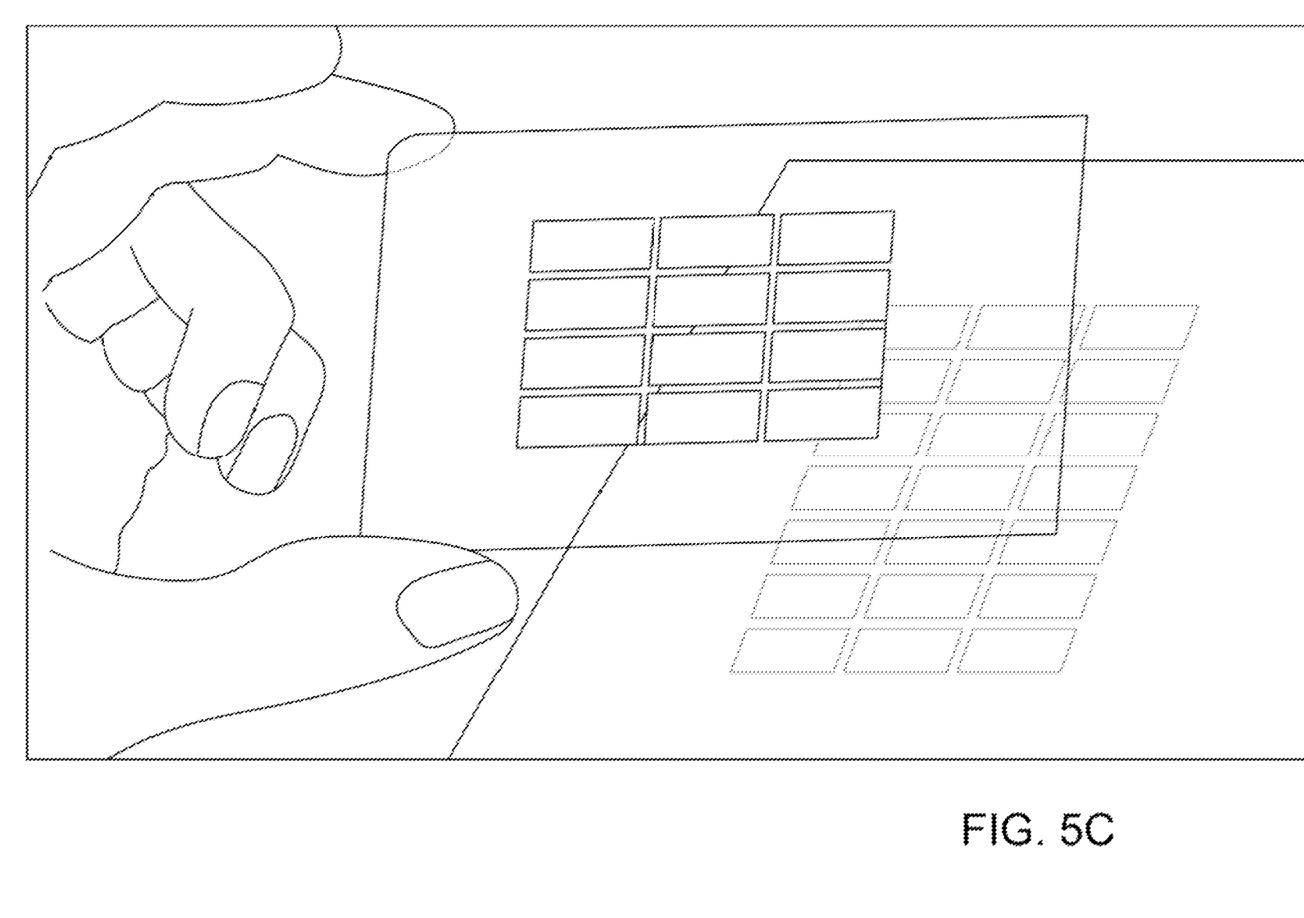

FIG. 5(c) shows a 3×4 array of holographic lenses which were formed in a photopolymer material laminated on a glass substrate, as fabricated using the apparatus of FIG. 5(b).

Figure 5D:
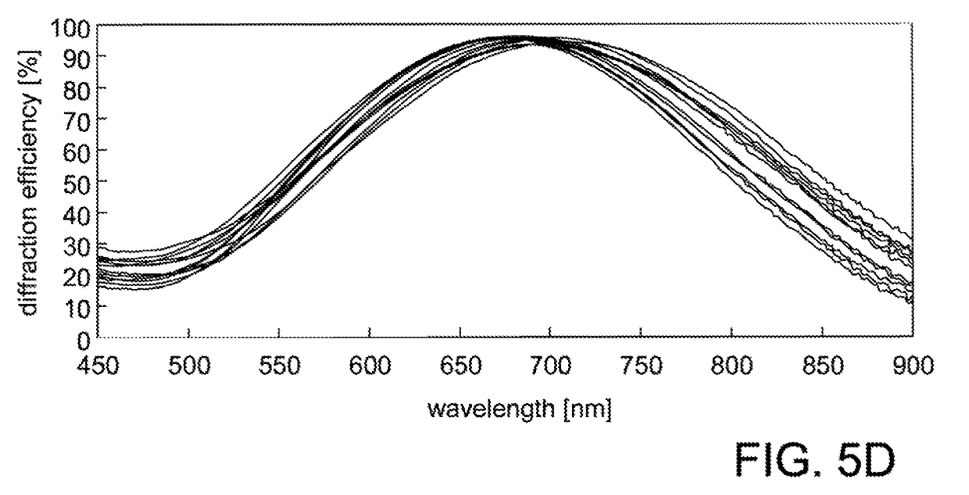

The diffraction efficiency over a broad spectrum was measured for each holographic lens of the 3×4 array of FIG. 5(c), and is shown in FIG. 5(d). The results show that the holographic lenses achieved exceptionally high median peak diffraction efficiency (95.3%) and low peak diffraction efficiency variation (0.9%).

The invention claimed is:

1. A method for fabricating a master holographic optical element (HOE), comprising:
  positioning a first face of a prism at a distance from an aperture;
  forming a reference beam coupling element in a master HOE in optical contact with a second face of the prism by illuminating the master HOE with a conjugate reference beam passed through the aperture, the first face of the prism, and the second face of the prism, and with a separate master reference beam initially incident on a third prism face and internally reflected to be incident on the master HOE through the second prism face; and forming an object beam coupling element, at a location different from that of the reference coupling element, in the master HOE in optical contact with the second face of the prism by illuminating the master HOE with a conjugate object beam passed through the aperture, the first face of the prism, and the second face of the prism, and with the separate master reference beam initially incident on a third prism face and internally reflected to be incident on the master HOE through the second prism face, wherein a master HOE comprising a directly encoded aperture function is provided, wherein forming the conjugate reference and conjugate object beams used in forming the master HOE coupling elements comprises modifying the light to match the aperture of the prism, wherein the aperture and the distance are the same when forming the reference beam and object beam coupling elements, and wherein the reference and object beam coupling elements may be formed in any sequential order.

2. The method of claim 1, wherein, in forming the reference beam coupling element, an absorber is positioned that blocks the master reference beam in regions where it is not internally reflected to be incident upon the reference beam coupling element.

3. The method of claim 1, wherein, in forming the object beam coupling element, an absorber is positioned that blocks the master reference beam in regions where it is not internally reflected to be incident upon the object beam coupling element.

4. The method of claim 1, wherein the master reference beam is a planar beam and normally incident on the third face of the prism and reflected to be incident on the master HOE through total internal reflection.

5. The method of claim 1, further comprising forming, by different exposures at different locations in the master HOE, multiple reference and object beam coupling elements to provide an array of multiple reference and object coupling elements in the master HOE.

6. The method of claim 5, wherein neighboring coupling elements in the array are formed by using dissimilar beam angles.

7. The method of claim 1, further comprising multiplexing the coupling elements on the master HOE at several different wavelengths.

8. A system for fabricating a master holographic optical element (HOE), comprising: a prism having a first, second and third face, the first face of the prism positioned separate and at a distance 'd' from an aperture; and a master HOE forming element in optical contact with the second face of the prism, wherein the prism, master HOE forming element and the aperture are configured to provide, in operation of the device, for illuminating or exposing the master HOE forming element with reference or object conjugate light beams passed through the aperture, the first face of the prism, and the second face of the prism, and with a separate master reference beam initially incident on the third prism face and internally reflected to be incident on the master HOE forming element through the second prism face, to provide for forming reference and object beam coupling elements at different respective locations in the master HOE forming element, wherein the aperture and the distance 'd' are the same when forming the reference beam and object beam coupling elements, and wherein the reference or object conjugate light beams are formed by modifying the light to match the aperture.

9. The system of claim 8, further comprising an absorber configured such that it blocks the master reference beam in regions where it is not internally reflected to be incident upon the master HOE forming element.

10. The system of claim 9, further comprising another absorber configured on the master HOE forming element to reduce spurious reflection grating formation during hologram formation.

11. The system of claim 8, further comprising a source of at least one of a master reference beam, a reference conjugate beam, and/or an object conjugate beam.

12. The system of claim 11, further comprising a source of a master reference beam configured to be planar beam and normally incident on the third face of the prism.

13. The system of claim 8, wherein the system is configured to form, by different exposures at different locations in the master HOE, multiple reference and object beam coupling elements to provide an array of multiple reference and object coupling elements in the master HOE.

14. A system for replicating holographic optical elements (HOE), comprising:
a master holographic optical element (HOE) having distinct object and reference beam coupling elements;
a prism having a first face and a second face, the master HOE and prism configured such that the first face of the prism is in optical contact with the distinct object and reference beam coupling elements of the master HOE to provide, in operation of the device, for coupling $1^{st}$ order light, transmitted from the distinct object and reference beam coupling elements, from the first face of the prism through the second face of the prism, and for filtering of unwanted $0^{th}$ order light from the prism by total internal reflection, wherein the master HOE comprises a directly encoded aperture function; and
a copy HOE, positioned at a distance and separate from the second face of the prism and the master HOE such that $1^{st}$ order object and reference beam light transmitted through the second face of the prism overlaps at an exposure region of the copy HOE to form a holographic exposure; and
a copy HOE support member, configured to laterally translate the copy HOE between repeated exposure of the copy HOE, to provide a copy HOE having an array of copied HOE.

15. The system of claim 14, wherein the master HOE comprises multiple distinct object and reference beam coupling elements to provide a multiplexed master HOE.

16. The system of claim 14, configured such that the $0^{th}$ order light is filtered from prism by total internal reflection through a third face of the prism.

17. The system of claim 14, further comprising a light source suitable for exposing the copy HOE.

* * * * *